United States Patent
Goel et al.

(10) Patent No.: US 12,346,147 B2
(45) Date of Patent: Jul. 1, 2025

(54) CIRCUIT AND METHODOLOGY FOR POWER PROFILE

(71) Applicant: Taiwan Semiconductor Manufacturing Company, Ltd., Hsinchu (TW)

(72) Inventors: Sandeep Goel, Dublin, CA (US); Ankita Patidar, San Jose, CA (US); Yun-Han Lee, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 39 days.

(21) Appl. No.: 18/365,006

(22) Filed: Aug. 3, 2023

(65) Prior Publication Data
US 2025/0044825 A1   Feb. 6, 2025

(51) Int. Cl.
*G06F 1/08* (2006.01)
*G06F 1/12* (2006.01)

(52) U.S. Cl.
CPC ..................................... *G06F 1/08* (2013.01)

(58) Field of Classification Search
CPC ..................... G06F 1/10; G06F 1/12
See application file for complete search history.

(56) References Cited

U.S. PATENT DOCUMENTS

| | | | |
|---|---|---|---|
| 9,304,532 B2 | 4/2016 | Jung | |
| 12,164,327 B2 * | 12/2024 | Lu | G06F 1/12 |
| 2005/0270073 A1 * | 12/2005 | Lee | G06F 1/08 |
| | | | 327/99 |
| 2009/0154285 A1 | 6/2009 | Pyeon | |
| 2013/0021072 A1 | 1/2013 | Wang et al. | |
| 2016/0041578 A1 * | 2/2016 | Lee | G06F 1/12 |
| | | | 327/146 |
| 2017/0214480 A1 * | 7/2017 | Kim | G06F 1/06 |
| 2019/0050020 A1 | 2/2019 | Chu | |
| 2022/0019276 A1 * | 1/2022 | King | G06F 1/06 |

FOREIGN PATENT DOCUMENTS

TW   I637266 B   10/2018

* cited by examiner

*Primary Examiner* — Phil K Nguyen
(74) *Attorney, Agent, or Firm* — Merchant & Gould P.C.

(57) ABSTRACT

A semiconductor device includes an on-chip clock controller configured to provide a clock output signal and configured to receive a mode signal and a speed enable signal, and to generate a first fast clock enable signal and a first slow clock enable signal. The on-chip clock controller is configured to override the first fast clock enable signal based on the mode signal and the speed enable signal to provide a fast clock in the clock output signal and to override the first slow clock enable signal based on the mode signal and the speed enable signal to provide a slow clock in the clock output signal.

20 Claims, 13 Drawing Sheets

116

| Power Analysis Summary | |
|---|---|
| Number of Scan Cells | 199253 |
| Number of Patterns | 0.19120 |
| Cycles Per Load | 258 |
| Average Capture Switching | 21527.72  10.80% |
| Peak Capture Switching | 44198  22.18% (pattern: 13986) |

FIG. 7

CIRCUIT AND METHODOLOGY FOR POWER PROFILE

BACKGROUND

Typically, testing a large-scale semiconductor device includes at least one scan phase for shifting test patterns into the device, at least one capture phase for exercising the device, and at least one scan phase for shifting results out of the device. In the scan phase for shifting test patterns into the device, the test patterns are loaded at a slower clock speed to initialize the device to a known state. In the capture phase, clock pulses are provided at a higher clock speed to exercise the device, referred to as at-speed testing. In the scan phase for shifting results out of the device, the results are shifted out at the slower clock speed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the disclosure and are not intended to be limiting.

FIG. 7 is a diagram schematically illustrating a Power Analysis Summary from an ATPG program after running the ATPG program on a semiconductor device design, in accordance with some embodiments.

DETAILED DESCRIPTION

Figure 1:
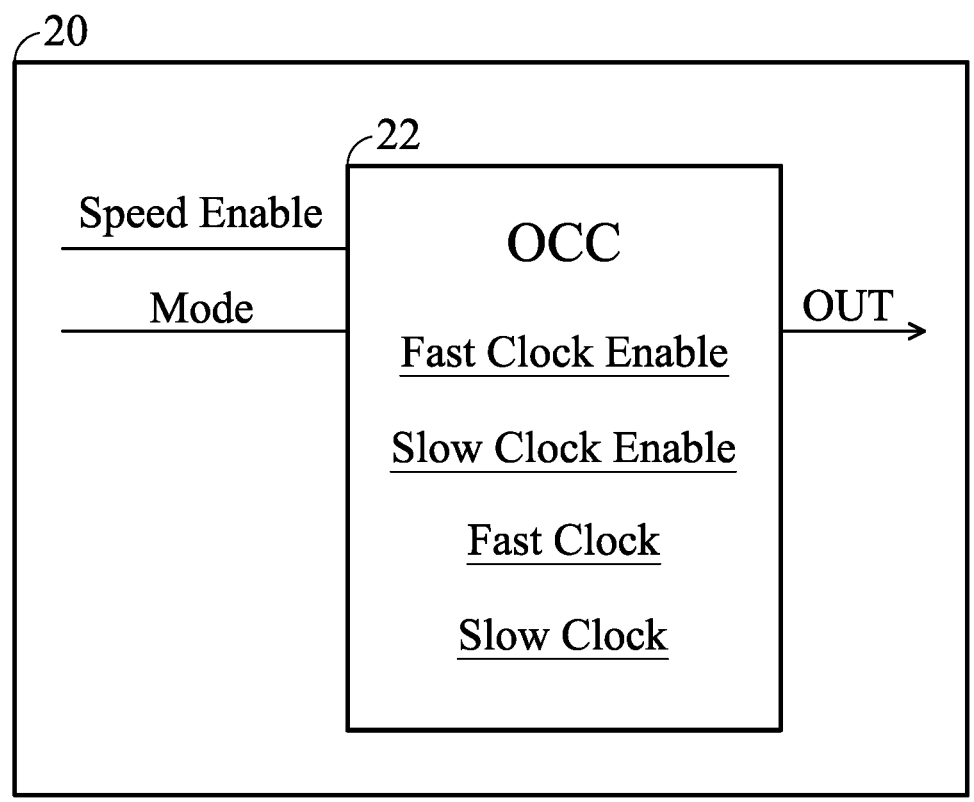
FIG. 1 is a diagram schematically illustrating a semiconductor device that includes an on-chip clock controller (OCC), in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In testing a semiconductor device at a higher clock speed, a relatively large number of the device's transistors switch at the higher clock speed, which increases the demand for current from the power grid. As a result, the demand for current may cause a power droop in the power grid of the device, which may cause the device to fail the at-speed test or to operate at a slower speed during the test. Often, application specific test patterns are used to check the power droop in the power grid of a device. For example, functional test patterns can be used for power check, current measurements, and heat generation testing.

Different sets of test patterns can also be used to stress the semiconductor device. For example, design-for-test (DFT) test patterns can be used to test the semiconductor device. The DFT test patterns are clocked into the semiconductor device during the scan phase and clocked through the semiconductor device during the capture phase. The results are clocked out of the semiconductor device during another scan phase. A clock controller clocks the DFT test patterns into, through and out of the semiconductor device. However, the number of capture pulses provided by the clock controller of the semiconductor device may be or is limited by the number of shift registers in the clock controller, which are used for providing an active clock enable signal. The capture pulses can only be provided while the clock enable signal is active, such that the capture pulses cannot be continuously provided by the clock controller. This can result in not achieving a toggle rate over a capture period, unsatisfactory current measurements, and unsatisfactory heat generation.

Disclosed embodiments include a semiconductor device that includes an on-chip clock controller (OCC) that provides shift pulses for shifting test patterns into the device and for shifting test results out of the device, and capture pulses for at-speed testing, such as at-speed testing of the device using DFT test patterns. The OCC controls the number of clock pulses and the clock speeds for shifting test patterns into the device, capturing results, and shifting test results out of the device. The number of clock pulses, such as the number of shift pulses and the number of capture pulses, can be different and exceed the number of shift registers in the OCC. In some embodiments, test patterns with high or maximum capture toggle rates are shifted into the device to achieve toggle/heat power requirements using a reduced number of shift pulses and capture pulses. In some embodiments, test patterns are shifted into the device using shift pulses that are slow clock pulses followed by capture pulses that are fast clock pulses and that exceed the number of shift registers in the OCC. In some embodiments, test patterns are shifted into the device using shift pulses that are slow clock pulses followed by capture pulses that are fast clock pulses and then followed by shift pulses that are slow clock pulses or fast clock pulses and, in some embodiments, followed by more capture pulses that are fast clock pulses.

Disclosed embodiments include an OCC configured to provide an increased number of fast/slow clock pulses without increasing the number of shift registers in the OCC. Also, the OCC can be programmed to provide different sequences of shift pulses and capture pulses. In addition, in some embodiments, the OCC is configured to shift in test patterns at a fast clock speed.

Disclosed embodiments further provide a method of obtaining power profile information on a semiconductor device. The method includes providing an OCC to control clock speeds for shifting test patterns and capturing results; running an automatic test pattern generation (ATPG) program to generate test patterns and report capture power; selecting a test pattern based on the capture power or a sequence pattern; updating signals to the OCC for shift and capture phases; running simulations to generate a vector change data (VCD) file; extracting the capture power from the VCD file; determining whether the capture power meets power requirements and if the capture power fails to meet the power requirements repeating the steps of selecting, updating, running, extracting, and determining whether the capture power meets power requirements; and preparing input for automatic test equipment (ATE) if the capture power meets the power requirements.

Advantages of the disclosed embodiments include managing the number and sequence of shift pulses and capture pulses, obtaining multiple power profiles with a single test, and targeting any testable path of a device for measurement and testing.

FIG. 1 is a diagram schematically illustrating a semiconductor device 20 that includes an OCC 22, in accordance with some embodiments. The OCC 22 receives a speed enable signal and a mode signal, and the OCC 22 provides one or more output signals OUT. Also, the OCC 22 generates a fast clock enable signal and a slow clock enable signal and, in some embodiments, the OCC 22 generates a fast clock signal and a slow clock signal. Also, in other embodiments, the OCC 22 receives a fast clock signal and a slow clock signal from outside the OCC 22.

In some embodiments, the OCC 22 provides a second fast clock enable signal and a second slow clock enable signal in the one or more output signals OUT. The second fast clock enable signal is based on the speed enable signal, the mode signal, and the fast clock enable signal and can be used for gating a fast clock signal. The second slow clock enable signal is based on the speed enable signal, the mode signal, and the slow clock enable signal and can be used for gating a slow clock signal.

In some embodiments, the OCC 22 provides a clock output signal OUT that includes shift pulses for shifting test patterns or one/zero sequence patterns into the device 20 and for shifting test results out of the device 20, and capture pulses for exercising the device 20 by clocking the test patterns or one/zero sequence patterns through the device 20. The OCC 22 controls the number of clock pulses and the clock speeds for the shift pulses and the capture pulses. In some embodiments, the capture pulses are at-speed capture pulses for clocking DFT test patterns, such as DFT transition/AC test patterns, through the device 20.

In these embodiments, the fast clock enable signal enables the OCC 22 to provide a fast clock in the clock output signal OUT, where the number of clock pulses is limited by the number of shift registers in the OCC 22 for providing an active fast clock enable signal. Also, in some embodiments, the slow clock enable signal enables the OCC 22 to provide a slow clock in the clock output signal OUT, where the number of clock pulses is limited by the number of shift registers in the OCC 22 for providing an active slow clock enable signal. In some embodiments, the OCC 22 includes five shift registers for providing the active fast clock enable signal, such that the OCC 22 is limited to providing five fast clock pulses. In some embodiments, the OCC 22 includes five shift registers for providing the active slow clock enable signal, such that the OCC 22 is limited to providing five slow clock pulses. In some embodiments, the same shift registers are used to provide the fast clock enable signal and the slow clock enable signal.

The OCC 22 is configured to override the fast clock enable signal based on the mode signal and the speed enable signal to provide a fast clock in the clock output signal OUT, where the number of fast clock pulses can exceed the number of shift registers in the OCC 22. The OCC 22 can provide any number of continuous fast clock pulses using the mode signal and the speed enable signal. Also, in some embodiments, the OCC 22 is configured to override the slow clock enable signal based on the mode signal and the speed enable signal to provide a slow clock in the clock output signal OUT, where the number of slow clock pulses can exceed the number of shift registers in the OCC 22. The OCC 22 can provide any number of continuous slow clock pulses using the mode signal and the speed enable signal.

In operation of the OCC 22, conflicting or contradictory signals, such as conflicting fast/slow clock enable signals, are not generated by the OCC 22. In some embodiments, the speed enable signal is provided through an input/output (IO) pad. In some embodiments, the mode signal is provided through an IO pad. In some embodiments, the mode signal is programmed into a flip-flop, such as a D flip-flop in the device 20, to set the mode.

The OCC 22 includes logic and/or other circuitry for performing the functions of the OCC 22. In some embodiments the OCC 22 includes logic gates, such as AND gates, OR gates, NAND gates, NOR gates, inverters (INV), and/or other logic gates to perform the functions of the OCC 22. In other embodiments, the OCC 22 includes other circuitry, such as multiplexers and/or programmable logic, to perform the functions of the OCC 22.

In some embodiments, the OCC 22 includes a first clock circuit configured to provide the second fast clock enable signal based on the mode signal, the speed enable signal, and the fast clock enable signal and to provide the second slow clock enable signal based on the mode signal, the speed enable signal, and the slow clock enable signal. In some embodiments, the OCC 22 includes a second clock circuit that receives the second fast clock enable signal and the second slow clock enable signal and provides the clock output signal OUT.

Figure 2A:
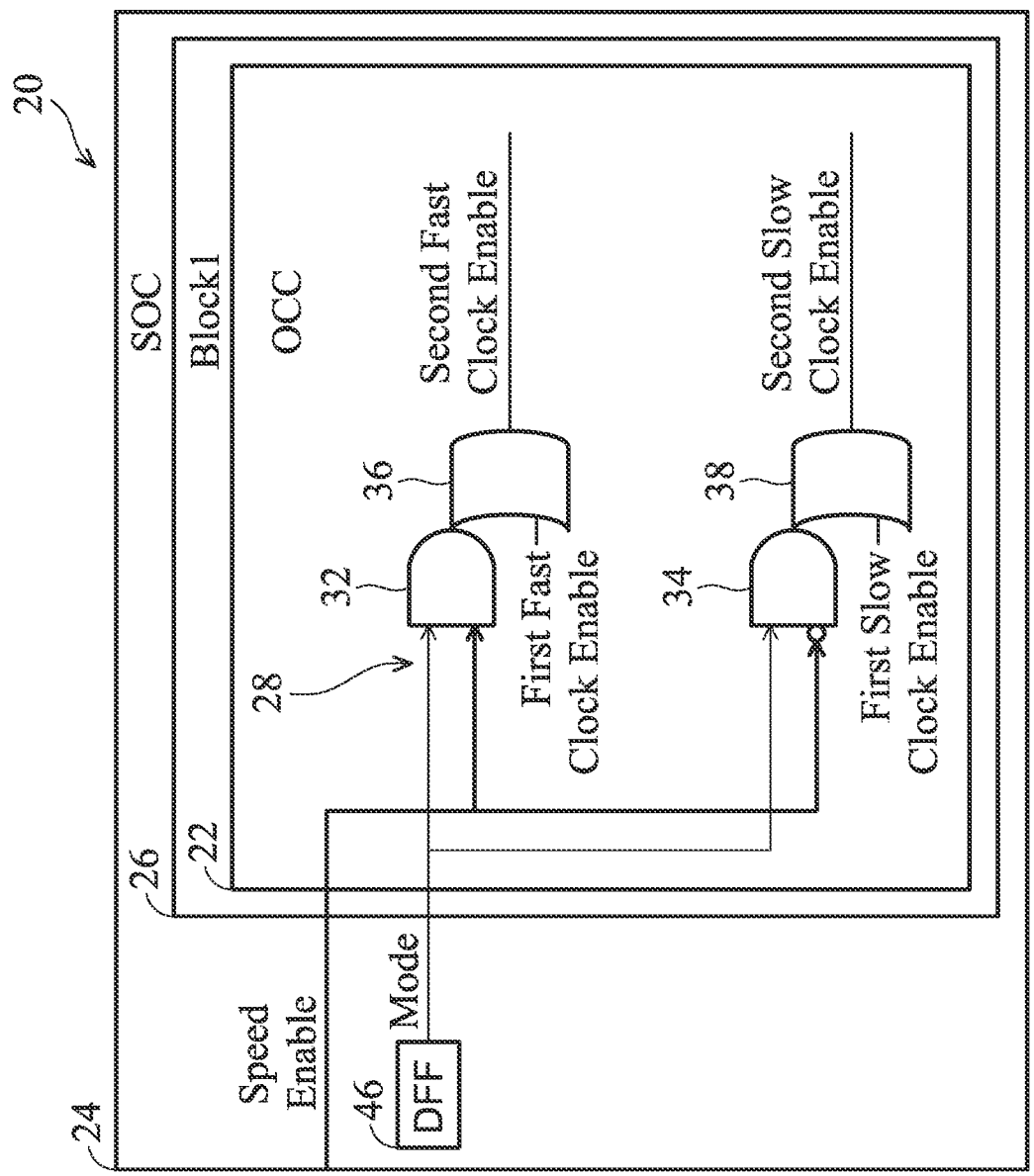
FIG. 2A is a diagram schematically illustrating an example of the semiconductor device of FIG. 1 that includes a first clock circuit in the OCC, in accordance with some embodiments.
Figure 2B:
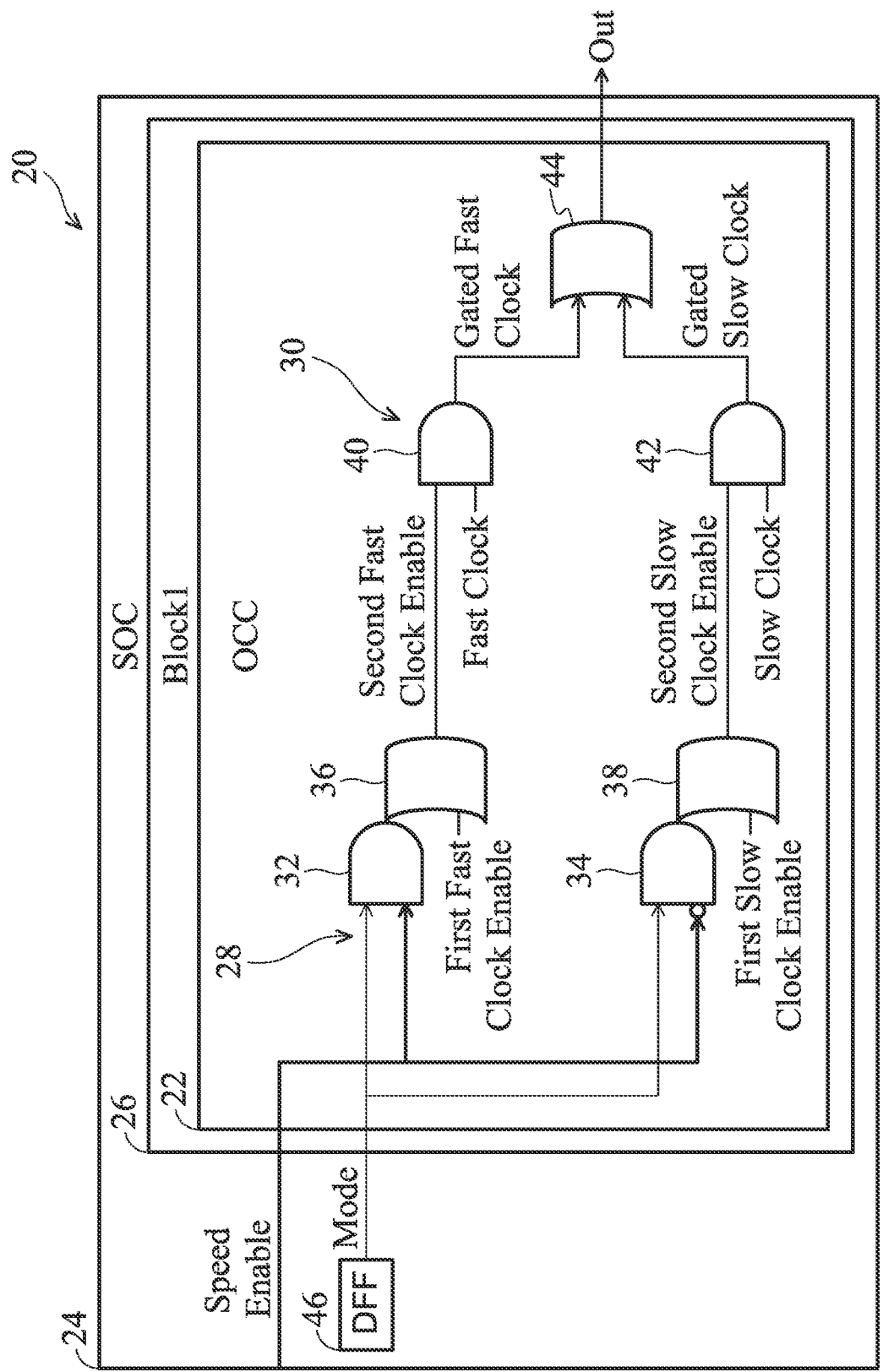
FIG. 2B is a diagram schematically illustrating an example of the semiconductor device of FIG. 1 that includes the first clock circuit and a second clock circuit in the OCC, in accordance with some embodiments.

FIGS. 2A and 2B are diagrams schematically illustrating examples of the semiconductor device 20 of FIG. 1, in accordance with some embodiments. FIG. 2A is a diagram schematically illustrating an example of the semiconductor device 20 of FIG. 1 that includes a first clock circuit 28 in the OCC 22, in accordance with some embodiments. FIG. 2B is a diagram schematically illustrating an example of the semiconductor device 20 of FIG. 1 that includes the first clock circuit 28 and a second clock circuit 30 in the OCC 22, in accordance with some embodiments. In these examples, the device 20 includes a system on a chip (SOC) 24 that includes a block circuit (BLOCK1) 26. The OCC 22 is situated in the block circuit 26. In other embodiments, the device 20 includes the OCC 22 without the SOC 24 and/or the block circuit 26.

In FIG. 2A the OCC 22 includes the first clock circuit 28 and in FIG. 2B the OCC 22 includes the first clock circuit 28 electrically connected to the second clock circuit 30 that provides the clock output signal OUT. The first clock circuit 28 includes a first AND gate 32 having a first non-inverted input that receives the mode signal and a second non-inverted input that receives the speed enable signal, and a second AND gate 34 having a third non-inverted input that receives the mode signal and an inverted input that receives the speed enable signal. The first AND gate 32 provides a first AND gate output signal and the second AND gate 34 provides a second AND gate output signal.

The first clock circuit 28 further includes a first OR gate 36 and a second OR gate 38. The first OR gate 36 receives the first AND gate output signal from the first AND gate 32 and a first fast clock enable signal and provides a second fast clock enable signal. The second OR gate 38 receives the second AND gate output signal from the second AND gate 34 and a first slow clock enable signal and provides a second slow clock enable signal. The first fast clock enable signal is the same as the fast clock enable signal (shown in FIG. 1) and the first slow clock enable signal is the same as the slow clock enable signal (shown in FIG. 1).

In FIG. 2B the second clock circuit 30 includes a third AND gate 40 and a fourth AND gate 42. The third AND gate 40 receives the second fast clock enable signal and the fast clock signal and provides a gated fast clock signal. The fourth AND gate 42 receives the second slow clock enable signal and the slow clock signal and provides a gated slow clock signal. The second clock circuit 30 further includes a third OR gate 44 that receives the gated fast clock signal and the gated slow clock signal and provides the clock output signal OUT.

The operation of the OCC 22 shown in FIG. 2B is described below. This includes the operation of the first clock circuit 28 that is illustrated in FIG. 2A and in FIG. 2B and the operation of the second clock circuit 30 that is illustrated in FIG. 2B. In operation, the OCC 22 receives the mode signal and the speed enable signal. Also, the OCC 22 generates the first fast clock enable signal, the first slow clock enable signal, the fast clock signal, and the slow clock signal and the OCC 22 provides the clock output signal OUT. In other embodiments, the OCC 22 receives the fast clock signal and the slow clock signal from outside the OCC 22.

The OCC 22 controls the clock output signal OUT to oscillate at the fast clock speed of the fast clock signal, the slow clock speed of the slow clock signal or, if neither the second fast clock enable signal nor the second slow clock enable signal is high, the OCC 22 controls the clock output signal OUT to be non-oscillating. In some embodiments, the speed enable signal is provided through an IO pad. In some embodiments, the mode signal is provided through an IO pad. In some embodiments, the mode signal is programmed into a flip-flop 46, such as a D flip-flop, to set the mode.

Assuming non-contradictory inputs, if the mode signal is low and the first fast clock enable signal is high then the second fast clock enable signal is high and the clock output signal OUT oscillates at the fast clock speed of the fast clock signal. The first fast clock enable signal enables the OCC 22 to provide the fast clock speed in the clock output signal OUT, where the number of clock pulses is limited by the number of shift registers in the OCC 22 for providing the high first fast clock enable signal.

Also, if the mode signal is low and the first slow clock enable signal is high then the second slow clock enable signal is high and the clock output signal OUT oscillates at the slow clock speed of the slow clock signal. The first slow clock enable signal enables the OCC 22 to provide the slow clock speed in the clock output signal OUT, where the number of clock pulses is limited by the number of shift registers in the OCC 22 for providing the high first slow clock enable signal.

In some embodiments, the OCC 22 includes five shift registers for providing the high first fast clock enable signal, such that the OCC 22 is limited to providing five fast clock pulses. In some embodiments, the OCC 22 includes five shift registers for providing the high first slow clock enable signal, such that the OCC 22 is limited to providing five slow clock pulses. In some embodiments, the same shift registers are used to provide the first fast clock enable signal and the first slow clock enable signal.

The OCC 22 is configured to override the first fast clock enable signal based on the mode signal and the speed enable signal to provide the fast clock in the clock output signal OUT, where the number of fast clock pulses can exceed the number of shift registers in the OCC 22. If the mode signal is high and the speed enable signal is high, the OCC 22 controls the clock output signal OUT to oscillate at the fast clock speed of the fast clock signal.

Also, the OCC 22 is configured to override the first slow clock enable signal based on the mode signal and the speed enable signal to provide the slow clock in the clock output signal OUT, where the number of slow clock pulses can exceed the number of shift registers in the OCC 22. If the mode signal is high and the speed enable signal is low, the OCC 22 controls the clock output signal OUT to oscillate at the slow clock speed of the slow clock signal.

In addition, if the mode signal is low and the first fast clock enable signal is low and the first slow clock enable signal is low, then the second fast clock enable signal is low and the second slow clock enable signal is low, such that the clock output signal OUT is non-oscillating.

Figure 3:
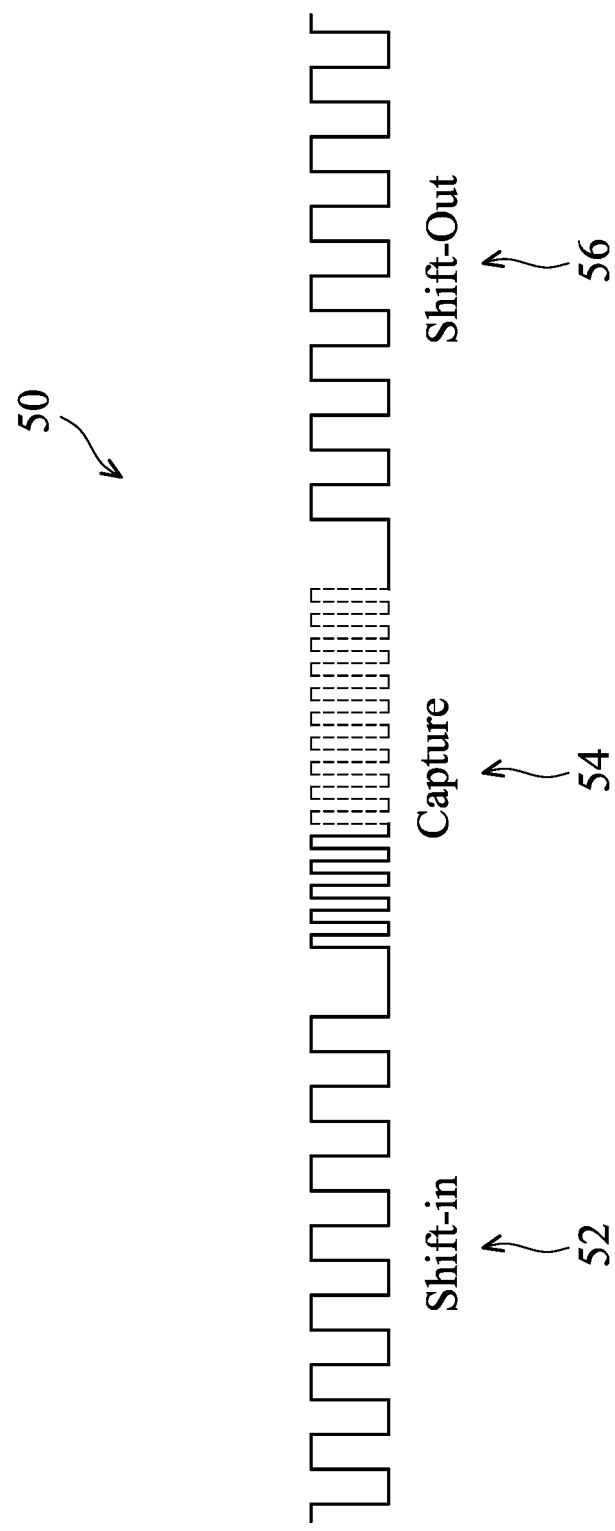
FIG. 3 is a diagram schematically illustrating a clock waveform provided in the clock output signal OUT of the OCC for testing the semiconductor device, in accordance with some embodiments.

FIG. 3 is a diagram schematically illustrating a clock waveform 50 provided in the clock output signal OUT of the OCC 22 for testing the semiconductor device 20, in accordance with some embodiments. The clock waveform 50 includes a shift-in phase 52, a capture phase 54, and a shift-out phase 56.

Assuming non-contradictory inputs, during the shift-in phase 52, the mode signal is high and the speed enable signal is low, such that the OCC 22 provides the slow clock of the slow clock signal in the clock output signal OUT. Test patterns and/or zero/one sequence patterns are shifted into the device 20. The mode signal and the speed enable signal override the first slow clock enable signal to provide the slow clock in the clock output signal OUT, where the number of slow clock pulses can exceed the number of shift registers in the OCC 22. In some embodiments, the test patterns are DFT test patterns.

Next, during the capture phase 54, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT, where the number of fast clock pulses can exceed the number of shift registers in the OCC 22. In the present example, the OCC 22 provides fifteen at-speed capture pulses. In other embodiments, the OCC 22 can provide another number of capture pulses, such as 16 or more pulses. In some embodiments, increasing the number of at-speed capture pulses increases the power consumption of the device 20.

During the shift-out phase 56, the mode signal is high and the speed enable signal is low, such that the OCC 22 provides the slow clock of the slow clock signal in the clock output signal OUT. The test results are shifted out of the device 20. The mode signal and the speed enable signal override the first slow clock enable signal to provide the slow clock in the clock output signal OUT, where the number of slow clock pulses can exceed the number of shift registers in the OCC 22.

Figure 4:
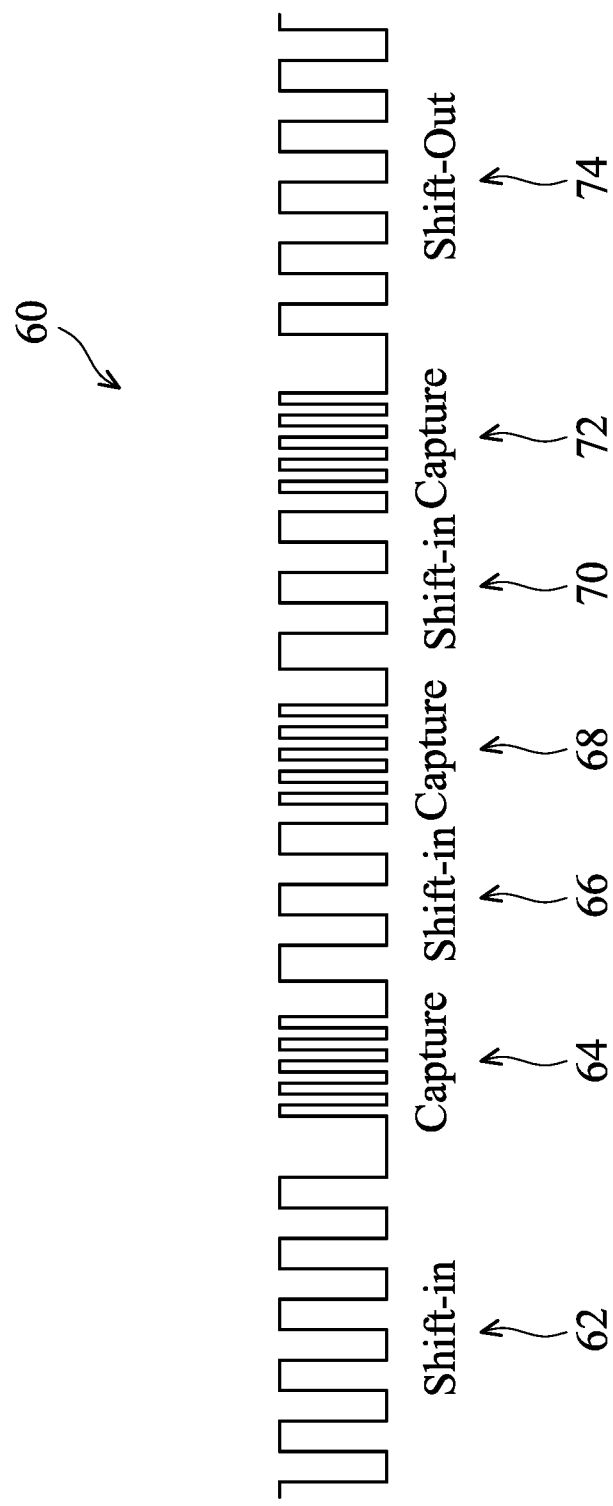
FIG. 4 is a diagram schematically illustrating another clock waveform provided in the clock output signal OUT of the OCC for testing the semiconductor device, in accordance with some embodiments.

FIG. 4 is a diagram schematically illustrating another clock waveform 60 provided in the clock output signal OUT of the OCC 22 for testing the semiconductor device 20, in accordance with some embodiments. The clock waveform 60 includes a first shift-in phase 62, a first capture phase 64, a second shift-in phase 66, a second capture phase 68, a third shift-in phase 70, a third capture phase 72, and a shift-out phase 74.

Assuming non-contradictory inputs, during the first shift-in phase 62, the mode signal is high and the speed enable signal is low, such that the OCC 22 provides the slow clock of the slow clock signal in the clock output signal OUT. Test patterns and/or zero/one sequence patterns are shifted into the device 20. The mode signal and the speed enable signal override the first slow clock enable signal to provide the slow clock in the clock output signal OUT. The number of slow clock pulses is selected to shift-in the test patterns and/or the zero/one sequence patterns, where the number of slow clock pulses can be any number and is not limited by the number of shift registers in the OCC 22. In some embodiments, the test patterns are DFT test patterns.

Next, during the first capture phase 64, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT, where the number of fast clock pulses can be any number of fast clock pulses, such as more or less than the number of shift registers in the OCC 22. In the present example, the OCC 22 provides five at-speed fast clock pulses. In other embodiments, the OCC 22 provides another number of fast clock pulses, such as more than five fast clock pulses.

During the second shift-in phase 66, the mode signal is high and the speed enable signal is low, such that the OCC 22 provides the slow clock of the slow clock signal in the clock output signal OUT. The slow clock pulses shift the test pattern and/or sequence pattern through the flip-flops of the device 20 to change the state of the device 20. The mode signal and the speed enable signal override the first slow clock enable signal to provide the slow clock in the clock output signal OUT. The number of slow clock pulses is selected to shift the test patterns and/or the zero/one sequence patterns a selected number of flip-flops. Any number of slow clock pulses can be selected, such that the number of slow clock pulses is not limited by the number of shift registers in the OCC 22. In the present example, the OCC 22 provides three slow clock pulses in the second shift-in phase 66. In other embodiments, the OCC 22 provides another number of slow clock pulses in the second shift-in phase 66.

By providing several slow clock pulses in the second shift-in phase 66, voltage droop in the power grid has time to settle. Also, changing the state of the flip-flops in the device 20 prepares the device 20 for the next at-speed capture phase.

Next, during the second capture phase 68, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT, where the number of fast clock pulses can be any number of clock pulses, such as more or less than the number of shift registers in the OCC 22. In the present example, the OCC 22 provides five at-speed fast clock pulses. In other embodiments, the OCC 22 provides another number of fast clock pulses, such as more than five fast clock pulses.

During the third shift-in phase 70, the mode signal is high and the speed enable signal is low, such that the OCC 22 provides the slow clock of the slow clock signal in the clock output signal OUT. The slow clock pulses shift the test pattern and/or sequence pattern in the flip-flops of the device 20 to change the state of the device 20. The mode signal and the speed enable signal override the first slow clock enable signal to provide the slow clock in the clock output signal OUT. The number of slow clock pulses is selected to shift the test patterns and/or the zero/one sequence patterns a selected number of flip-flops. Any number of slow clock pulses can be selected, such that the number of slow clock pulses is not limited by the number of shift registers in the OCC 22. In the present example, the OCC 22 provides three slow clock pulses in the third shift-in phase 70. In other embodiments, the OCC 22 provides another number of slow clock pulses in the third shift-in phase 70.

By providing several slow clock pulses in the third shift-in phase 70, the voltage droop in the power grid has time to settle out. Also, changing the state of the flip-flops in the device 20 prepares the device 20 for the next at-speed capture phase.

Next, during the third capture phase 72, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT, where the number of fast clock pulses can be any number of clock pulses, such as more or less than the number of shift registers in the OCC 22. In the present example, the OCC 22 provides five at-speed fast clock pulses. In other embodiments, the OCC 22 provides another number of fast clock pulses, such as more than five fast clock pulses.

During the shift-out phase 74, the mode signal is high and the speed enable signal is low, such that the OCC 22 provides the slow clock of the slow clock signal in the clock output signal OUT. The test results are shifted out of the device 20. The mode signal and the speed enable signal override the first slow clock enable to provide the slow clock in the clock output signal OUT, where any number of slow clock pulses can be provided and the number of slow clock pulses can exceed the number of shift registers in the OCC 22.

In other embodiments, any number of shift-in phases and capture phases can be provided to test the semiconductor device 20. Also, in other embodiments, any number of clock pulses can be provided in each of the shift-in phases and in each of the capture phases.

By providing shift-in phases between capture phases, the toggle rate, i.e., the number of flip-flop toggles during a capture period, can be increased, which increases the power consumption of the device 20. In some embodiments, providing shift-in phases with slow clock speeds between capture phases with fast clock speeds increases the toggle rate (power consumption) to be higher than simply increasing the number of fast clock pulses in a single capture phase as shown in FIG. 3.

Figure 5:
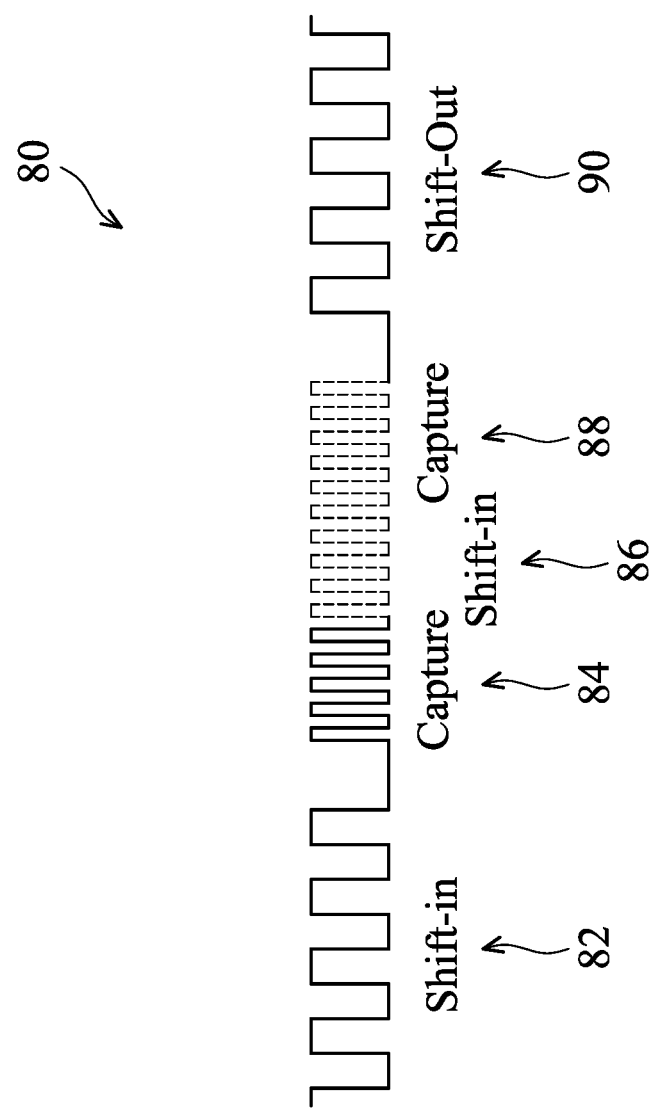
FIG. 5 is a diagram schematically illustrating a clock waveform that includes fast clock pulses in a second shift-in phase that is situated between a first capture phase and a second capture phase, in accordance with some embodiments.

FIG. 5 is a diagram schematically illustrating a clock waveform 80 that includes fast clock pulses in a second shift-in phase 86 that is situated between a first capture phase 84 and a second capture phase 88, in accordance with some embodiments. The clock waveform 80 is provided in the clock output signal OUT of the OCC 22 for testing the semiconductor device 20. The clock waveform 80 includes a first shift-in phase 82, the first capture phase 84, the second shift-in phase 86, the second capture phase 88, and a shift-out phase 90. In some embodiments, the clock waveform 80 is used for heat generation testing of the device 20.

Assuming non-contradictory inputs, during the first shift-in phase 82, the mode signal is high and the speed enable signal is low, such that the OCC 22 provides the slow clock of the slow clock signal in the clock output signal OUT. Test patterns and/or zero/one sequence patterns are shifted into the device 20. The mode signal and the speed enable signal override the first slow clock enable signal to provide the slow clock in the clock output signal OUT. The number of slow clock pulses is selected to shift-in the test patterns and/or the zero/one sequence patterns, where the number of slow clock pulses can be any selected number and not limited by the number of shift registers in the OCC 22. In some embodiments, the test patterns are DFT test patterns.

Next, during the first capture phase 84, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT. Any number of fast clock pulses can be provided by the OCC 22, such as more or less than the number of shift registers in the OCC 22. In the present example, the OCC 22 provides five at-speed fast clock pulses. In other embodiments, the OCC 22 provides another number of fast clock pulses, such as more than five fast clock pulses.

During the second shift-in phase 86, the mode signal is high and the speed enable signal is high, such that the OCC 22 provides the fast clock of the fast clock signal in the clock output signal OUT. In some embodiments, the fast clock pulses shift the test pattern and/or sequence pattern through the flip-flops of the device 20 to change the state of the device 20. In other embodiments, the fast clock pulses in the second shift-in phase 86 are provided to increase power consumption, such that the fast clock pulses may or may not shift the test pattern and/or sequence pattern through the flip-flops of the device 20 to change the state of the device 20.

In the second shift-in phase 86, the mode signal and the speed enable signal override the first fast clock enable signal to provide the fast clock in the clock output signal OUT. Any number of fast clock pulses can be selected, such that the number of fast clock pulses is not limited by the number of shift registers in the OCC 22. In the present example, the OCC 22 provides five fast clock pulses in the second shift-in phase 86. In other embodiments, the OCC 22 provides another number of fast clock pulses in the second shift-in phase 86, such as six fast clock pulses, twelve fast clock pulses, twenty-four fast clock pulses, or another number of fast clock pulses.

By providing the fast clock pulses in the second shift-in phase 86, the power consumption of the device 20 can be increased and, in some embodiments, the state of the flip-flops in the device 20 are changed to prepare the device 20 for the next at-speed capture phase.

Next, during the second capture phase 88, the mode signal is high and the speed enable signal is high, such that the OCC 22 provides the fast clock of the fast clock signal in the clock output signal OUT. The test patterns or zero/one sequence patterns are clocked through the device 20 to exercise the device 20 at the operational speed of the device 20, i.e., at-speed. The mode signal and the speed enable signal override the first fast clock enable signal to provide the fast clock in the clock output signal OUT, where the number of fast clock pulses can be any number of clock pulses, such as more or less than the number of shift registers in the OCC 22. In the present example, the OCC 22 provides five at-speed fast clock pulses. In other embodiments, the OCC 22 provides another number of fast clock pulses, such as more than five fast clock pulses.

During the shift-out phase 90, the mode signal is high and the speed enable signal is low, such that the OCC 22 provides the slow clock of the slow clock signal in the clock output signal OUT. The test results or remaining patterns are shifted out of the device 20. The mode signal and the speed enable signal override the first slow clock enable signal to provide the slow clock in the clock output signal OUT, where any number of slow clock pulses can be provided and the number of slow clock pulses can be different than the number of shift registers in the OCC 22.

In other embodiments, any number of shift-in phases and capture phases can be provided in a clock waveform for testing the semiconductor device 20. Also, in other embodiments, any number of clock pulses can be provided in each of the shift-in phases and in each of the capture phases.

By providing a shift-in phase between capture phases, the toggle rate, i.e., the number of flip-flop toggles during a capture period, can be increased, which increases the power consumption of the device 20. Also, in some embodiments, providing a shift-in phase with fast clock pulses between capture phases with fast clock pulses increases the toggle rate (power consumption) of the device 20. In addition, in some embodiments, providing a shift-in phase with fast clock pulses between capture phases with fast clock pulses increases the toggle rate (power consumption) of the device 20 to be higher than the toggle rate provided by the clock waveform 50 of FIG. 3 and the toggle rate provided by the clock waveform 60 of FIG. 4.

Figure 6:
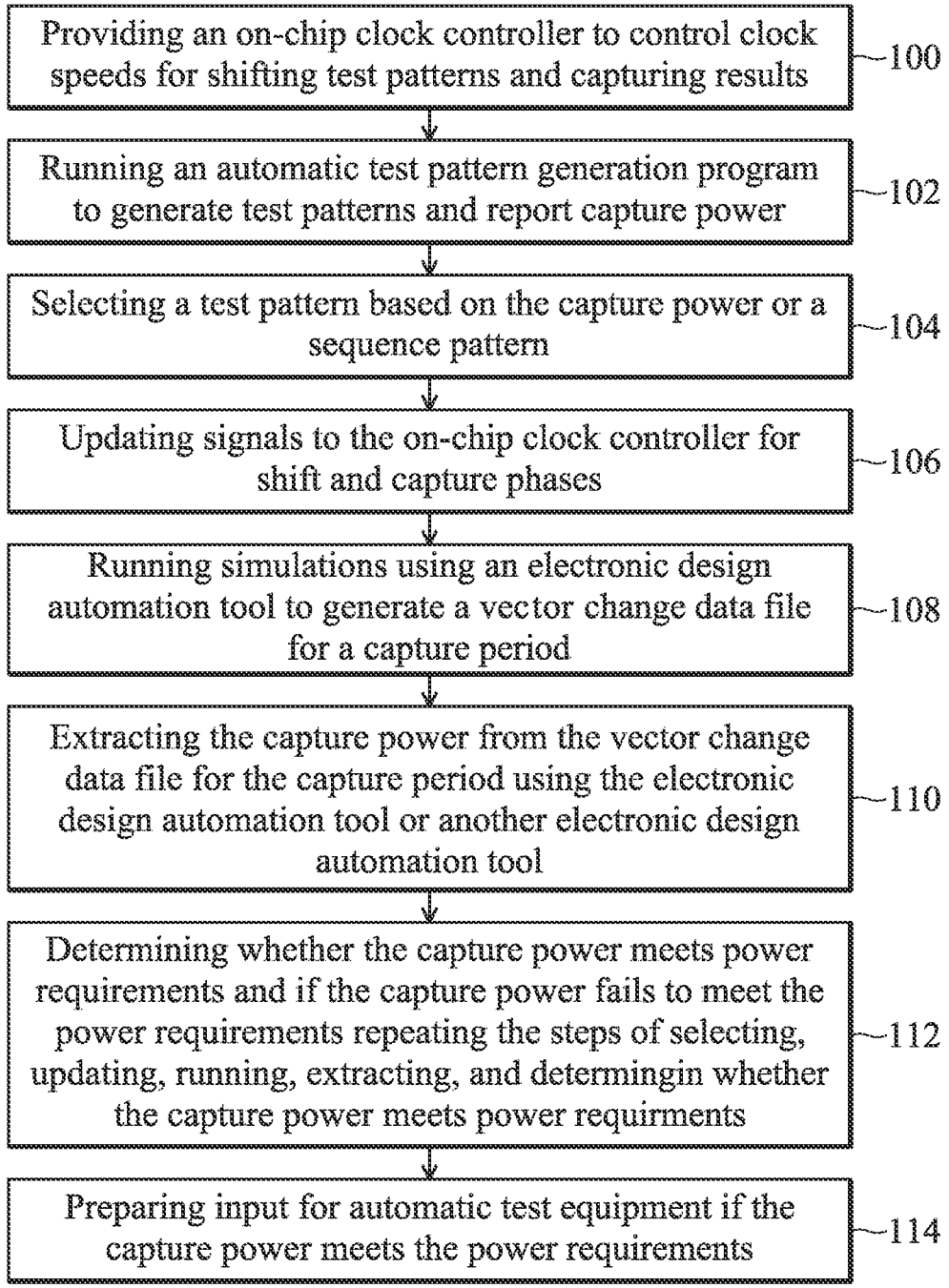
FIG. 6 is a diagram schematically illustrating a method of obtaining power profile information on a semiconductor device, in accordance with some embodiments.

FIG. 6 is a diagram schematically illustrating a method of obtaining power profile information on a semiconductor device, in accordance with some embodiments. In some embodiments, the semiconductor device is the same as the semiconductor device 20 of FIG. 1. In some embodiments, the semiconductor device is the same as the semiconductor device 20 of FIG. 2.

At 100, the method includes providing an OCC to control clock speeds for shifting test patterns (and/or zero/one sequence patterns) and for capturing results. In some embodiments, the OCC provides shift pulses for shifting test patterns and/or zero/one sequence patterns into the device and for shifting test results out of the device. Also, the OCC provides capture pulses for at-speed testing, such as at-speed testing of the device using DFT test patterns. The OCC controls the number of clock pulses and the clock speeds for shifting test patterns and/or zero/one sequence patterns into the device, capturing results, and shifting test results out of the device. In some embodiments, the OCC is the same as the OCC 22 in FIG. 1. In some embodiments, the OCC is the same as the OCC 22 in FIG. 2A. In some embodiments, the OCC is the same as the OCC 22 in FIG. 2B.

In some embodiments, the method includes providing an OCC that provides at least four different clocks including a clock that provides up to a limited number of clock pulses based on the number of shift registers in the OCC, a slow clock, a fast clock, and switching between a slow clock and a fast clock.

The OCC, such as the OCC 22, is configured to override the fast clock enable signal with the mode signal and the speed enable signal to provide a fast clock in the clock output signal OUT, where the number of fast clock pulses can be any number of fast clock pulses and exceed the number of shift registers in the OCC. The OCC can provide any number of fast clock pulses in the clock output signal OUT using the mode signal and the speed enable signal. Also, in some embodiments, the OCC is configured to override the slow clock enable signal with the mode signal and the speed enable signal to provide a slow clock in the clock output signal OUT, where the number of slow clock pulses can be any number of slow clock pulses and exceed the number of shift registers in the OCC. The OCC can provide any number of slow clock pulses in the clock output signal OUT using the mode signal and the speed enable signal.

At step 102, the method includes running an ATPG program to generate test patterns and report capture power. The ATPG program generates test patterns for testing the semiconductor device. Also, the ATPG program reports the switching rates or toggle rates, which are used to indicate the capture power.

FIG. 7 is a diagram schematically illustrating a Power Analysis Summary 116 from an ATPG program after running the ATPG program on a semiconductor device design, in accordance with some embodiments. The number of scan cells in the design is 199253 and the number of test patterns generated is 0-19120. The number of clock cycles per load of a test pattern averages 258 clock cycles and the average capture switching or toggling is 21527.72 or a toggle rate of about 10.8%. The peak capture switching or toggling is 44198 or about 22.18% using pattern number 13986.

Referring to FIG. 6, at 104, the method includes selecting a test pattern based on the capture power or selecting a zero/one sequence pattern. In some embodiments, the test pattern that produces the highest or peak toggle rate, such as test pattern 13986 that produced the peak toggle rate of 22.18%, is selected. In some embodiments, to get an even higher toggle rate or at least a different toggle rate, a zero/one sequence pattern is selected.

At 106, the method includes updating signals to the OCC for the shift phases and the capture phases. In some embodiments, updating signals to the OCC includes programming or providing the mode signal and the speed enable signal to provide a fast clock in the clock output signal OUT during capture phases. In some embodiments, updating signals to the OCC includes programming or providing the mode signal and the speed enable signal to provide a fast clock or a slow clock in the clock output signal OUT during shift-in phases. In some embodiment, updating signals to the OCC includes activating a scan enable signal (not shown) to switch to shifting patterns into and out of the semiconductor device. In some embodiment, updating signals to the OCC includes de-activating the scan enable signal (not shown) to switch to a capture phase for exercising the semiconductor device.

At 108, the method includes running simulations using an electronic design automation (EDA) tool to generate a VCD file for a capture period. The VCD file includes vector change data for the capture period.

At 110, the method includes extracting the capture power, such as the toggle rate, from the VCD file for the capture period using the EDA tool or another EDA tool. In some embodiments, the VCD is loaded into a PTPX (EDA) tool to extract the toggle count information for the semiconductor device under test. In some embodiments, the power is calculated based on the clock period and the capture window, where the toggle rate percentage is equal to the quantity of (the toggle count per net times the clock period) divided by the capture window.

At 112, the method includes determining whether the capture power meets power requirements and if the capture power fails to meet the power requirements repeating the steps of selecting, updating, running, extracting, and determining whether the capture power meets the power requirements. In some embodiments, selecting a test pattern and updating signals to the OCC includes, if the capture power is less than the power requirements, at least one of changing the test pattern or the sequence pattern to increase the capture power and increasing the number of shift pulses between capture phases. Also, in some embodiments, selecting a test pattern and updating signals to the OCC includes, if the capture power is more than the power requirements, at least one of changing the test pattern or the sequence pattern to decrease the capture power and decreasing the number of fast clock shift pulses or using slow clock shift pulses.

At 114, the method includes preparing input for ATE if the capture power meets the power requirements. In some embodiments, preparing input includes using standard test interface language (STIL) patterns or converting from VCD to waveform generation language (WGL) for the ATE if the capture power meets the power requirements.

Figure 8:
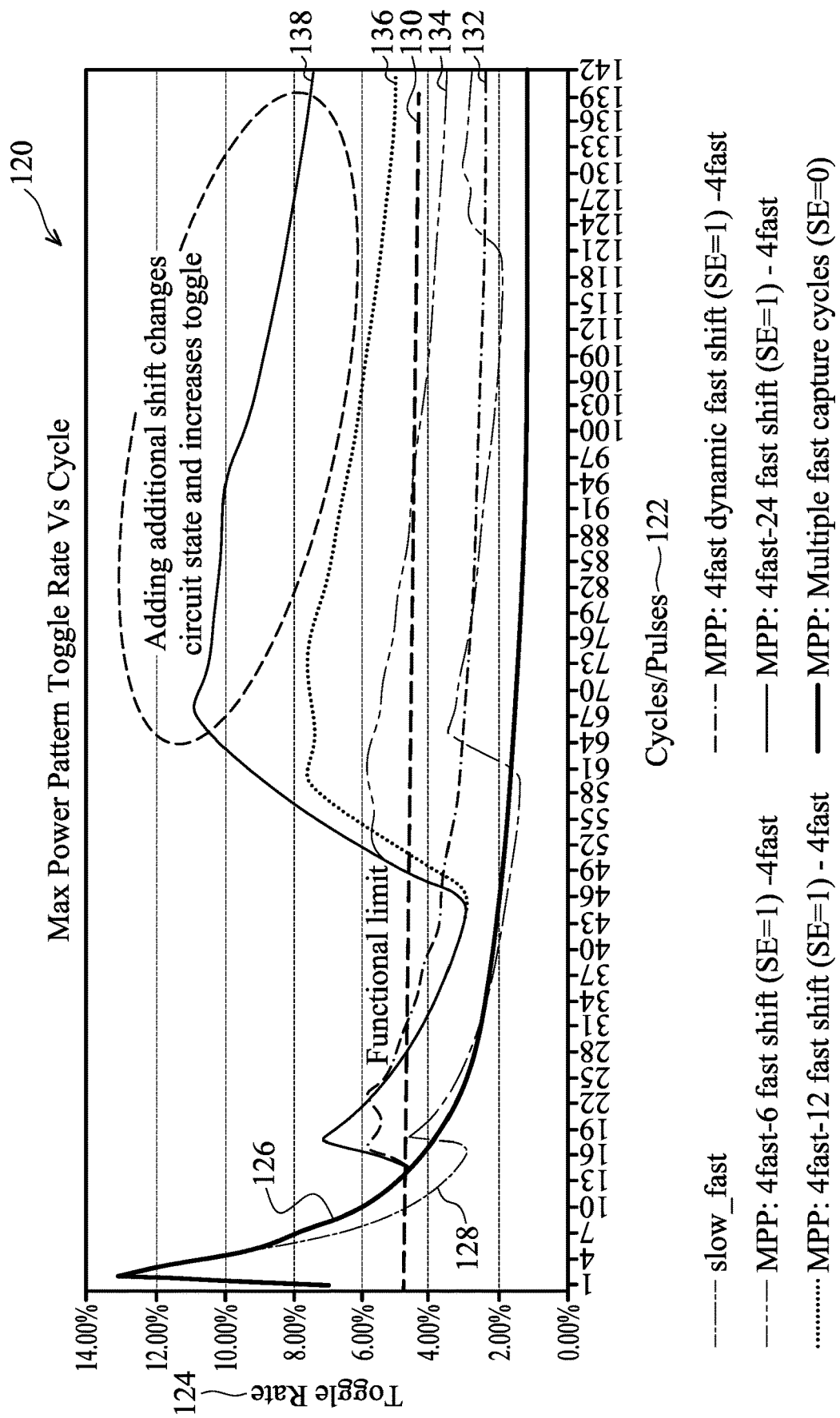
FIG. 8 is a diagram schematically illustrating a graph of maximum power pattern toggle rates versus number of cycles or pulses, in accordance with some embodiments.

FIG. 8 is a diagram schematically illustrating a graph 120 of maximum power pattern toggle rates versus number of cycles or pulses, in accordance with some embodiments. The graph 120 has the number of pulses along the x-axis 122 and the toggle rate along the y-axis 124.

In a graph of the toggle rate for multiple fast capture pulses 126, the toggle rate peaks at about 13% within the first five pulses and then goes down to about 2% in a long, smooth curve. The multiple fast capture pulses are provided in a waveform like the waveform 50 of FIG. 3. Thus, the peak toggle rate of 13% occurs early in the capture phase and then the toggle rate settles to a relatively constant toggle rate of 2%.

In a graph of the toggle rate for slow shift clock speeds and fast capture clock speeds 128, the toggle rate peaks at 13% within the first five pulses and then drops lower than the toggle rate for the multiple fast capture pulses 126, before rebounding to a toggle rate of about 5% at 18 pulses. The toggle rate for the slow shift clock speeds and fast capture clock speeds 128 then drops in a smooth curve to about 2% at 60 pulses before rebounding to between 3% and 4% at 64 pulses and rebounding again at about 121 pulses. The slow shift clock speeds and fast capture clock speeds are provided in a waveform like the waveform 60 of FIG. 4. Where, the shifting phases between capture phases result in rebounds in the toggle rate for the slow shift clock speeds and fast capture clock speeds 128.

After the initial toggle rate peak of 13%, both the toggle rate for multiple fast capture pulses 126 and the toggle rate for slow shift clock speeds and fast capture clock speeds 128 remain below a functional limit 130 of about 5% that was achieved using functional test patterns in Dhrystone testing.

In a graph of the toggle rate for dynamic (changing) fast shift-in pulses between fast capture pulses 132, the toggle rate peaks at 13% within the first five pulses and then drops to the functional limit 130 of about 5% before rebounding to a toggle rate of about 6% at 16 pulses and dropping in a smooth curve thereafter to a toggle rate of about 3%. The dynamic (changing) fast shift-in pulses between fast capture pulses are provided in a waveform like the waveform 80 of FIG. 5.

In a graph of the toggle rate for 6 fast shift-in pulses between fast capture pulses 134, the toggle rate peaks at 13% within the first five pulses and then drops to the functional limit 130 of about 5% before rebounding to a toggle rate of about 7% at 16 pulses. Then, the toggle rate for 6 fast shift-in pulses between fast capture pulses 134, drops in a smooth curve to a toggle rate of about 3% at 46 pulses, rebounds to a toggle rate of 6% at about 52 pulses, and drops to a toggle rate of less than 4%. The 6 fast shift-in pulses between fast capture pulses are provided in a waveform like the waveform 80 of FIG. 5.

In the long run, after many pulses, both the toggle rate for dynamic (changing) fast shift-in pulses between fast capture pulses 132 and the toggle rate for 6 fast shift-in pulses between fast capture pulses 134 drop below the functional limit 130 of about 5%.

In a graph of the toggle rate for 12 fast shift-in pulses between fast capture pulses 136, the toggle rate peaks at 13% within the first five pulses and then drops to the functional limit 130 of about 5% before rebounding to a toggle rate of about 7% at 18 pulses. Then, the toggle rate for 12 fast shift-in pulses between fast capture pulses 136 drops in a smooth curve to a toggle rate of about 3% at 46 pulses, rebounds to a toggle rate of 8% at about 58 pulses, and drops to a toggle rate of greater than 5%. The 12 fast shift-in pulses between fast capture pulses are provided in a waveform like the waveform 80 of FIG. 5.

In a graph of the toggle rate for 24 fast shift-in pulses between fast capture pulses 138, the toggle rate peaks at 13% within the first five pulses and then drops to the functional limit 130 of about 5% before rebounding to a toggle rate of about 7% at 18 pulses. Then, the toggle rate for 24 fast shift-in pulses between fast capture pulses 138 drops in a smooth curve to a toggle rate of about 3% at 46 pulses, rebounds to a toggle rate of about 11% at about 67 pulses, and drops to a toggle rate of about 8% at 142 pulses. The 24 fast shift-in pulses between fast capture pulses are provided in a waveform like the waveform 80 of FIG. 5.

Adding multiple high-speed clock pulses during the shift-in phases that are between capture phases as in the waveform 80 of FIG. 5, increases the toggle rate of the device. Also, in the long run, after many pulses, both the toggle rate for 12 fast shift-in pulses between fast capture pulses 136 and the toggle rate for 24 fast shift-in pulses between fast capture pulses 136 remain above the functional limit 130 of about 5%.

Figure 9:
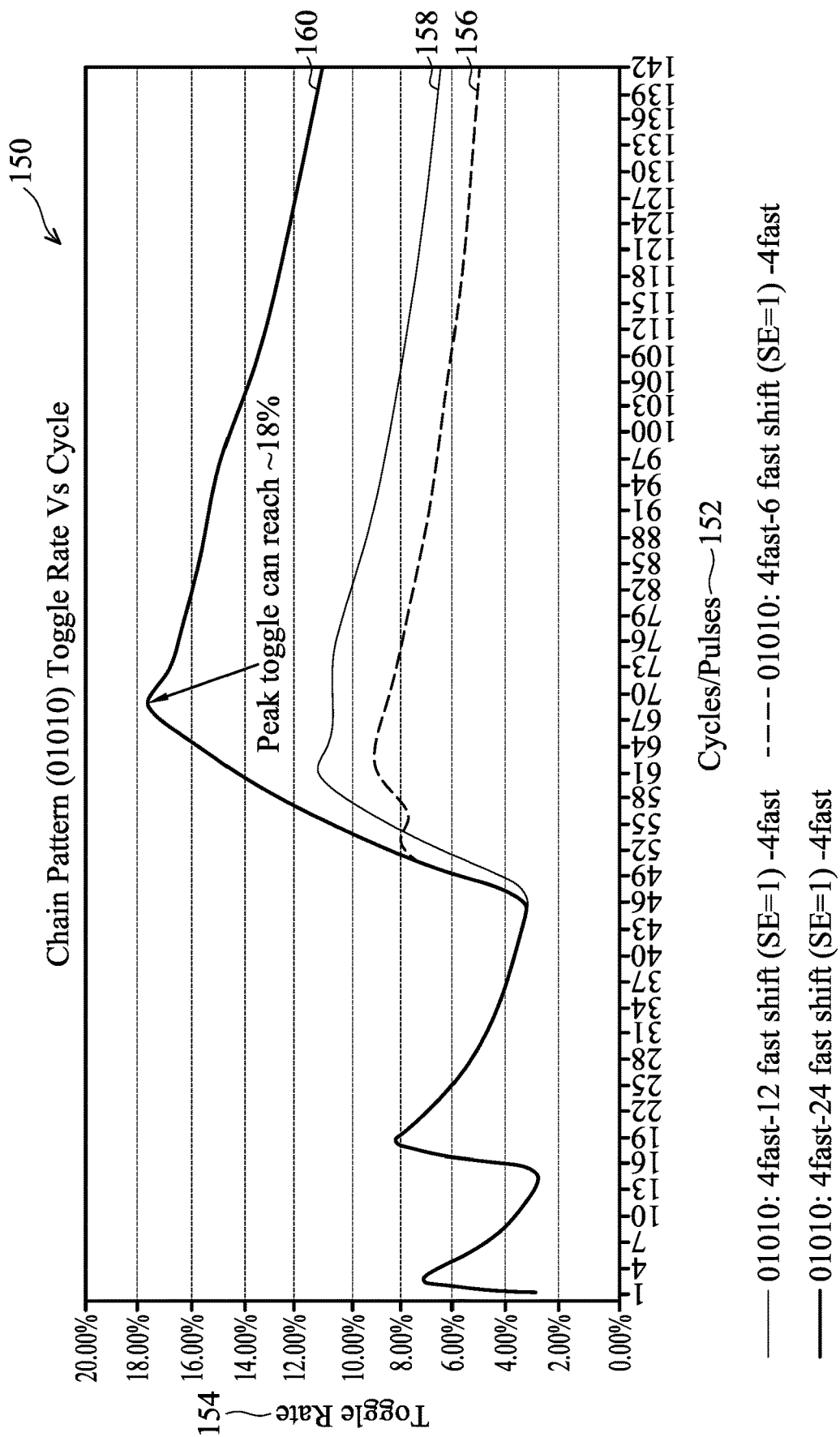
FIG. 9 is a diagram schematically illustrating a graph of chain (zero/one) pattern toggle rates versus number of cycles or pulses, in accordance with some embodiments.

FIG. 9 is a diagram schematically illustrating a graph 150 of chain (zero/one) pattern toggle rates versus number of cycles or pulses, in accordance with some embodiments. The graph 150 has the number of pulses along the x-axis 152 and the toggle rate along the y-axis 154.

In a graph of the toggle rate for 6 fast shift-in pulses between fast capture pulses 156, the toggle rate rises to 7% within the first five pulses and then drops to about 3% at 15 pulses, before rebounding to a toggle rate of about 8% at 18 pulses. Then, the toggle rate drops in a smooth curve to a toggle rate of about 3% at 46 pulses, rebounds to a toggle rate of 7%-8% at about 52 pulses, and drops to a toggle rate of about 5%, which is about the same as the functional limit 130 of about 5%. The 6 fast shift-in pulses between fast capture pulses are provided in a waveform like the waveform 80 of FIG. 5.

In a graph of the toggle rate for 12 fast shift-in pulses between fast capture pulses 158, the toggle rate rises to 7% within the first five pulses and then drops to about 3% at 15 pulses before rebounding to a toggle rate of about 8% at 18 pulses. Then, the toggle rate drops in a smooth curve to a toggle rate of about 3% at 46 pulses, rebounds to a toggle rate of 11% at about 58 pulses and drops to a toggle rate of a little more than 6%, which is higher than the functional limit 130 of about 5%. The 12 fast shift-in pulses between fast capture pulses are provided in a waveform like the waveform 80 of FIG. 5.

In a graph of the toggle rate for 24 fast shift-in pulses between fast capture pulses 160, the toggle rate rises to 7% within the first five pulses and then drops to about 3% at 15 pulses before rebounding to a toggle rate of about 8% at 18 pulses. Then, the toggle rate drops in a smooth curve to a toggle rate of about 3% at 46 pulses, rebounds to a toggle rate of about 18% at about 67 pulses, and drops to a toggle rate of about 11%, which is higher than the functional limit 130 of about 5%. The 24 fast shift-in pulses between fast capture pulses are provided in a waveform like the waveform 80 of FIG. 5.

For the chain (zero/one) pattern toggle rates, adding multiple high-speed clock pulses during the shift-in phases between capture phases, as in the waveform 80 of FIG. 5, increases the toggle rates. Also, after many pulses the toggle rates for the 6 fast shift-in pulses between fast capture pulses 156, the 12 fast shift-in pulses between fast capture pulses 158, and the 24 fast shift-in pulses between fast capture pulses 160 remain above the functional limit 130 of about 5%.

Figure 10:
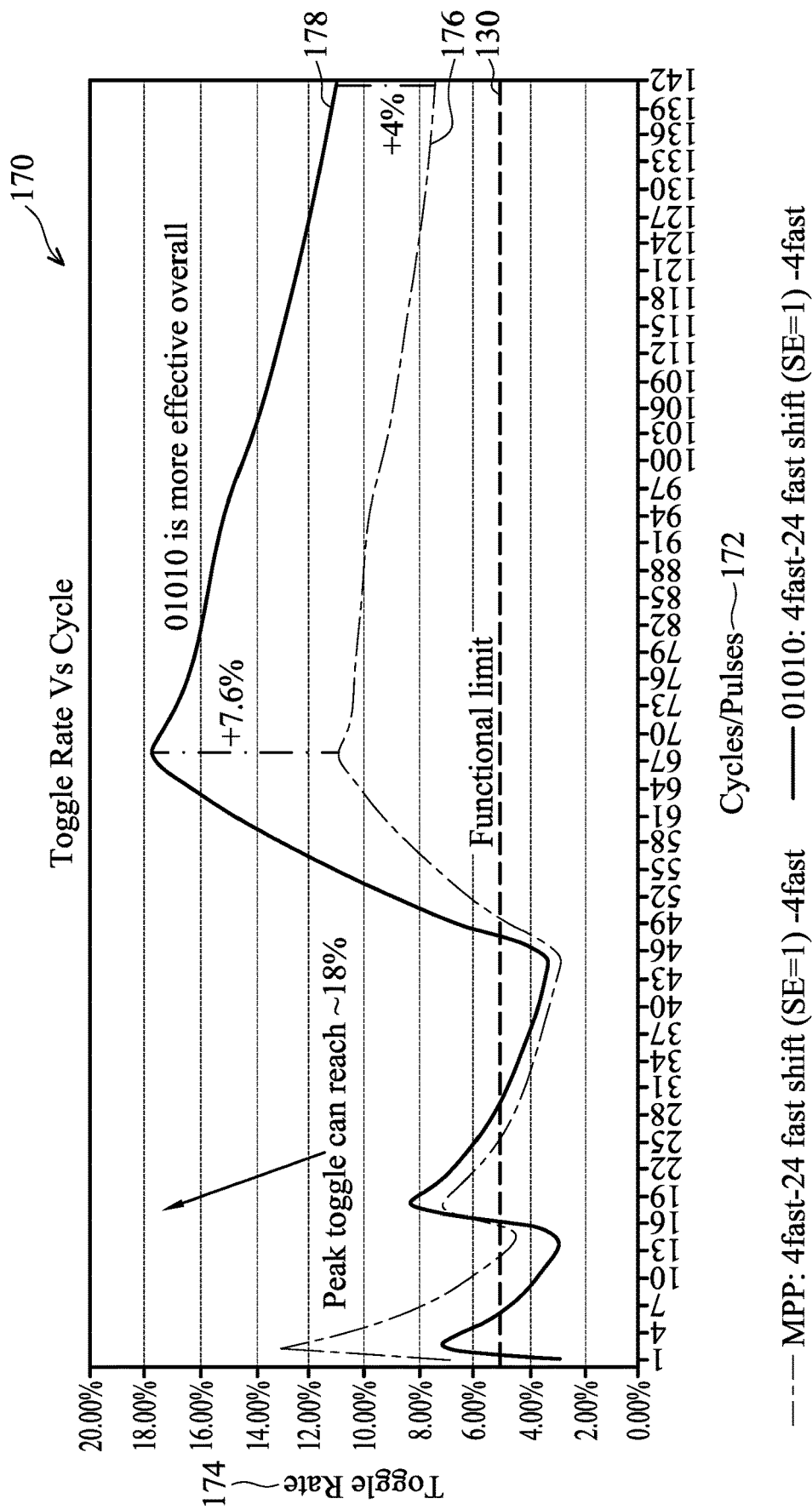
FIG. 10 is a diagram schematically illustrating a graph of a maximum power pattern toggle rate and a chain (zero/one) pattern toggle rate versus number of cycles or pulses, in accordance with some embodiments.

FIG. 10 is a diagram schematically illustrating a graph 170 of a maximum power pattern toggle rate and a chain (zero/one) pattern toggle rate versus number of cycles or pulses, in accordance with some embodiments. The graph 170 has the number of pulses along the x-axis 172 and the toggle rate along the y-axis 174.

In a graph of the maximum power pattern toggle rate for 24 fast shift-in pulses between fast capture pulses 176, the toggle rate peaks at 13% within the first five pulses and then drops to the functional limit 130 of about 5% before rebounding to a toggle rate of about 7% at 18 pulses. Then, the toggle rate drops in a smooth curve to about 3% at 46 pulses, rebounds to a toggle rate of about 10%-11% (10.4%) at about 67 pulses and drops to a toggle rate of about 7% at 142 pulses, which is higher than the functional limit 130 of about 5%. The 24 fast shift-in pulses between fast capture pulses are provided in a waveform like the waveform 80 of FIG. 5.

In a graph of the chain (zero/one) pattern toggle rate for 24 fast shift-in pulses between fast capture pulses 178, the toggle rate rises to 7% within the first five pulses and then drops to about 3% at 15 pulses before rebounding to a toggle rate of about 8% at 18 pulses. Then, the toggle rate drops in a smooth curve to about 3% at 46 pulses, rebounds to a toggle rate of about 18% at about 67 pulses, and drops to a toggle rate of about 11% at 142 pulses, which is higher than the functional limit 130 of about 5%. The 24 fast shift-in pulses between fast capture pulses are provided in a waveform like the waveform 80 of FIG. 5.

Within the first five pulses, the maximum power pattern toggle rate for 24 fast shift-in pulses between fast capture pulses 176 has a higher toggle rate of 13% versus a toggle rate of 7% for the chain (zero/one) pattern toggle rate for 24 fast shift-in pulses between fast capture pulses 178. This results from the maximum power pattern being biased to catch defects in the device as compared to the chain (zero/one) pattern not being biased to catch defects in the device. Thus, the maximum power pattern toggle rate for 24 fast shift-in pulses between fast capture pulses 176 is used to achieve a higher toggle rate in a smaller number of pulses.

However, after many pulses, the chain (zero/one) pattern toggle rate for 24 fast shift-in pulses between fast capture pulses 178 has a higher toggle rate of 18% versus a toggle rate of about 10.4% for the maximum power pattern toggle rate for 24 fast shift-in pulses between fast capture pulses 176, or a difference of 7.6%. Also, after many more pulses, the chain (zero/one) pattern toggle rate for 24 fast shift-in pulses between fast capture pulses 178 has a higher toggle rate of 11% versus a toggle rate of about 7% for the maximum power pattern toggle rate for 24 fast shift-in pulses between fast capture pulses 176, or a difference of 4%. Thus, the chain (zero/one) pattern toggle rate for 24 fast shift-in pulses between fast capture pulses 178 is used to achieve a higher toggle rate in a larger number of pulses, such as for heat generation.

Figure 11:
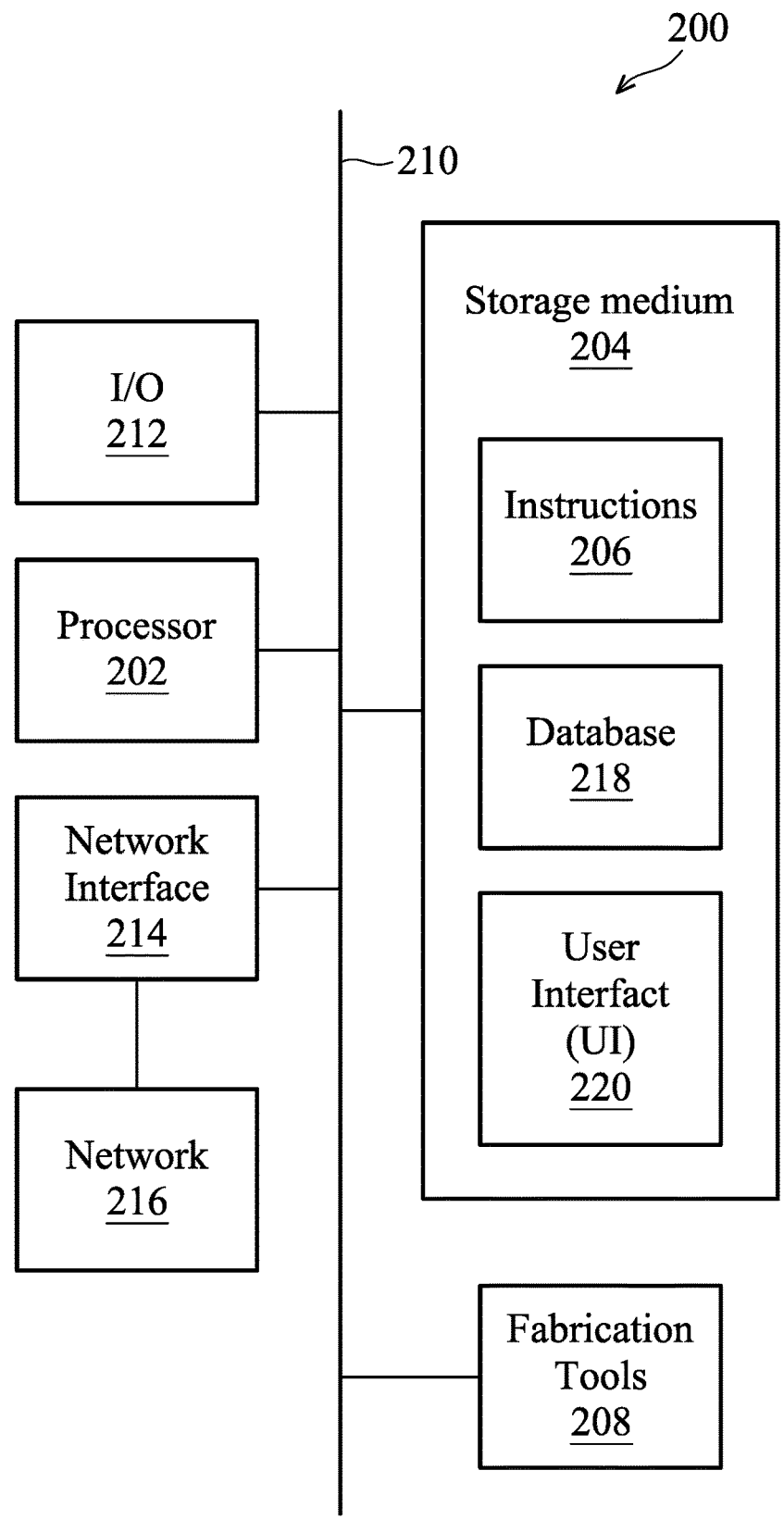
FIG. 11 is a block diagram schematically illustrating an example of a computer system configured to provide the semiconductor devices and methods of the current disclosure, in accordance with some embodiments.

FIG. 11 is a block diagram schematically illustrating an example of a computer system 200 configured to provide the semiconductor devices and methods of the current disclosure, in accordance with some embodiments. Some or all the design, layout, and manufacture of the semiconductor devices, also referred to as semiconductor circuits, can be performed by or with the computer system 200. In some embodiments, the computer system 200 includes an electronic design automation (EDA) system. In some embodiments, the semiconductor devices are ICs.

In some embodiments, the system 200 is a general-purpose computing device including a processor 202 and a non-transitory, computer-readable storage medium 204. The computer-readable storage medium 204 may be encoded with, e.g., store, computer program code such as executable instructions 206. Execution of the instructions 206 by the processor 202 provides (at least in part) a design tool that implements a portion or all the functions of the system 200, such as pre-layout simulations, post-layout simulations, routing, rerouting, and final layout for manufacturing. Further, fabrication tools 208 are included to further layout and physically implement the design and manufacture of the semiconductor devices. In some embodiments, execution of the instructions 206 by the processor 202 provides (at least in part) a design tool that implements a portion or all the functions of the system 200. In some embodiments, the system 200 includes a commercial router. In some embodiments, the system 200 includes an automatic place and route (APR) system.

The processor 202 is electrically coupled to the computer-readable storage medium 204 by a bus 210 and to an I/O interface 212 by the bus 210. A network interface 214 is also electrically connected to the processor 202 by the bus 210. The network interface 214 is connected to a network 216, so that the processor 202 and the computer-readable storage medium 204 can connect to external elements using the network 216. The processor 202 is configured to execute the computer program code or instructions 206 encoded in the computer-readable storage medium 204 to cause the system 200 to perform a portion or all the functions of the system 200, such as providing the semiconductor devices and methods of the current disclosure and other functions of the system 200. In some embodiments, the processor 202 is a central processing unit (CPU), a multi-processor, a distributed processing system, an application specific integrated circuit (ASIC), and/or a suitable processing unit.

In some embodiments, the computer-readable storage medium 204 is an electronic, magnetic, optical, electromagnetic, infrared, and/or semiconductor system or apparatus or device. For example, the computer-readable storage medium 204 can include a semiconductor or solid-state memory, a magnetic tape, a removable computer diskette, a random-access memory (RAM), a read-only memory (ROM), a rigid magnetic disk, and/or an optical disk. In some embodiments using optical disks, the computer-readable storage medium 204 can include a compact disk read only memory (CD-ROM), a compact disk read/write memory (CD-R/W), and/or a digital video disc (DVD).

In some embodiments, the computer-readable storage medium 204 stores computer program code or instructions 206 configured to cause the system 200 to perform a portion or all the functions of the system 200. In some embodiments, the computer-readable storage medium 204 also stores information which facilitates performing a portion or all the functions of the system 200. In some embodiments, the computer-readable storage medium 204 stores a database 218 that includes one or more of component libraries, digital circuit cell libraries, and databases.

The system 200 includes the I/O interface 212, which is coupled to external circuitry. In some embodiments, the I/O interface 212 includes a keyboard, keypad, mouse, trackball, trackpad, touchscreen, and/or cursor direction keys for communicating information and commands to the processor 202.

The network interface 214 is coupled to the processor 202 and allows the system 200 to communicate with the network 216, to which one or more other computer systems are connected. The network interface 214 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 200 can be performed in two or more systems that are like system 200.

The system 200 is configured to receive information through the I/O interface 212. The information received through the I/O interface 212 includes one or more of instructions, data, design rules, libraries of components and cells, and/or other parameters for processing by the processor 202. The information is transferred to the processor 202 by the bus 210. Also, the system 200 is configured to receive information related to a user interface (UI) through the I/O interface 212. This UI information can be stored in the computer-readable storage medium 204 as a UI 220.

In some embodiments, a portion or all the functions of the system 200 are implemented via a standalone software application for execution by a processor. In some embodiments, a portion or all the functions of the system 200 are implemented in a software application that is a part of an additional software application. In some embodiments, a portion or all the functions of the system 200 are implemented as a plug-in to a software application. In some embodiments, at least one of the functions of the system 200 is implemented as a software application that is a portion of an EDA tool. In some embodiments, a portion or all the functions of the system 200 are implemented as a software application that is used by the system 200. In some embodiments, a layout diagram is generated using a tool such as VIRTUOSO available from CADENCE DESIGN SYSTEMS, Inc., or another suitable layout generating tool.

In some embodiments, the routing, layouts, and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a digital video disc or a digital versatile disc (DVD), a magnetic disk such as a hard disk, a semiconductor memory such as a ROM and a RAM, and a memory card, and the like.

As noted above, embodiments of the system 200 include fabrication tools 208 for implementing the manufacturing processes of the system 200. For example, based on the final layout, photolithographic masks may be generated, which are used to fabricate the semiconductor device by the fabrication tools 208.

Figure 12:
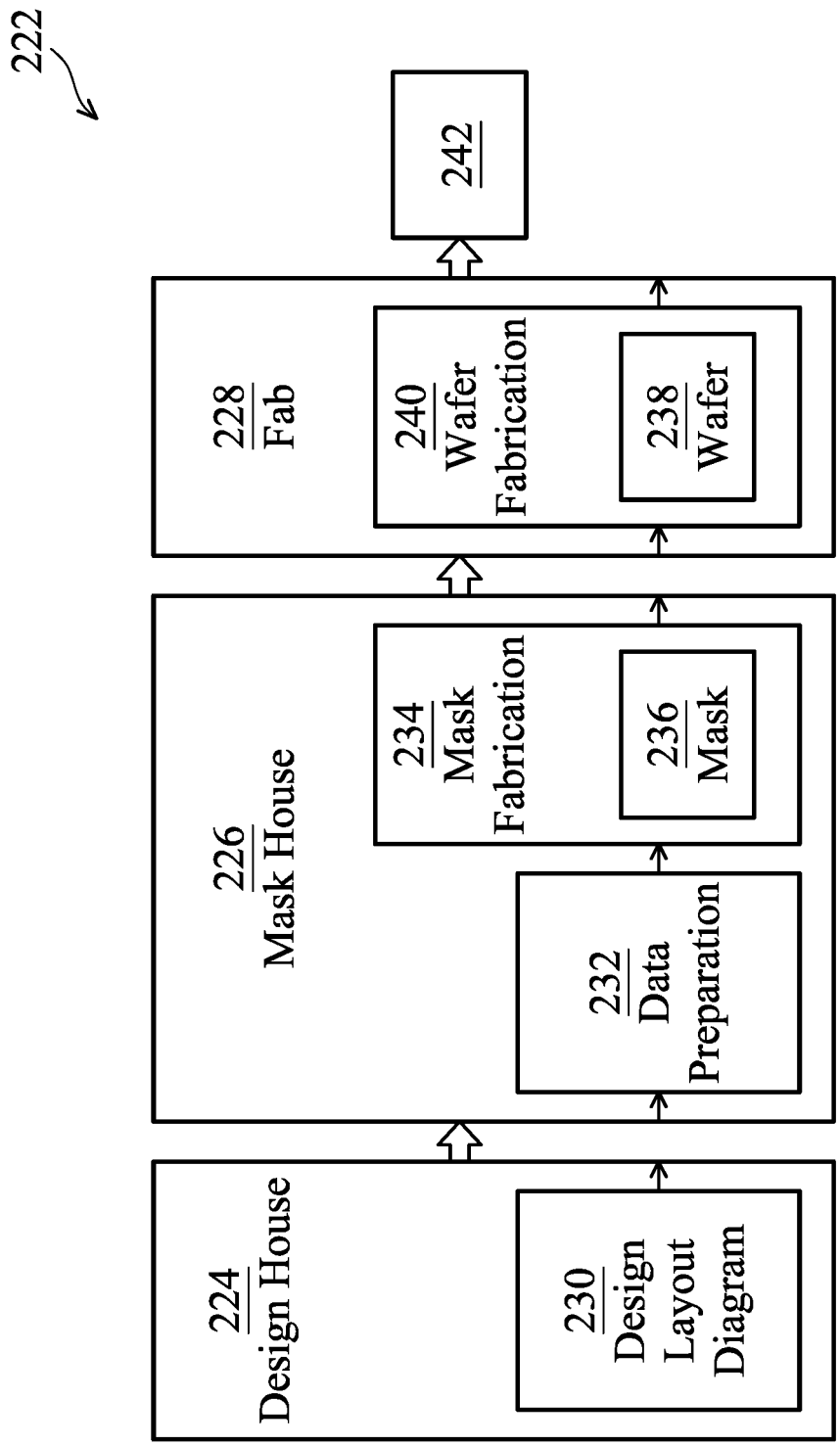
FIG. 12 is a block diagram of a semiconductor device manufacturing system and a semiconductor device manufacturing flow associated therewith, in accordance with some embodiments.

Further aspects of device fabrication are disclosed in conjunction with FIG. 12, which is a block diagram of a semiconductor device manufacturing system 222 and a semiconductor device manufacturing flow associated therewith, in accordance with some embodiments. In some embodiments, based on a layout diagram, one or more semiconductor masks and/or at least one component in a layer of a semiconductor device is fabricated using the manufacturing system 222.

In FIG. 12, the semiconductor device manufacturing system 222 includes entities, such as a design house 224, a mask house 226, and a semiconductor device manufacturer/fabricator ("Fab") 228, that interact with one another in the design, development, and manufacturing cycles and/or services related to manufacturing a semiconductor device, such as the semiconductor devices described herein. The entities in the system 222 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 224, the mask house 226, and the semiconductor device fab 228 are owned by a single larger company. In some embodiments, two or more of the design house 224, the mask house 226, and the semiconductor device fab 228 coexist in a common facility and use common resources.

The design house (or design team) 224 generates a semiconductor device design layout diagram 230. The semiconductor device design layout diagram 230 includes various geometrical patterns, or semiconductor device layout diagrams designed for a semiconductor device. The geometrical patterns correspond to patterns of metal, oxide, or semiconductor layers that make up the various components of the semiconductor structures to be fabricated. The various layers combine to form various semiconductor device features. For example, a portion of the semiconductor device design layout diagram 230 includes various semiconductor device features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate. The design house 224 implements a design procedure to form a semiconductor device design layout diagram 230. The semiconductor device design layout diagram 230 is presented in one or more data files having information of the geometrical patterns. For example, semiconductor device design layout diagram 230 can be expressed in a GDSII file format or DFII file format. In some embodiments, the design procedure includes one or more of analog circuit design, digital circuit design, logic circuit design, standard cell circuit design, power distribution network (PDN) design including power via design, supply voltage track design, reference voltage track design, place and route routines, and physical layout designs.

The mask house 226 includes data preparation 232 and mask fabrication 234. The mask house 226 uses the semiconductor device design layout diagram 230 to manufacture one or more masks 236 to be used for fabricating the various layers of the semiconductor device or semiconductor structure. The mask house 226 performs mask data preparation 232, where the semiconductor device design layout diagram 230 is translated into a representative data file (RDF). The mask data preparation 232 provides the RDF to the mask fabrication 234. The mask fabrication 234 includes a mask writer that converts the RDF to an image on a substrate, such as a mask (reticle) 236 or a semiconductor wafer 238. The design layout diagram 230 is manipulated by the mask data preparation 232 to comply with characteristics of the mask writer and/or criteria of the semiconductor device fab 228. In FIG. 12, the mask data preparation 232 and the mask fabrication 234 are illustrated as separate elements. In some embodiments, the mask data preparation 232 and the mask fabrication 234 can be collectively referred to as mask data preparation.

In some embodiments, the mask data preparation 232 includes an optical proximity correction (OPC) which uses lithography enhancement techniques to compensate for image errors, such as those that can arise from diffraction, interference, other process effects and the like. The OPC adjusts the semiconductor device design layout diagram 230. In some embodiments, the mask data preparation 232 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 232 includes a mask rule checker (MRC) that checks the semiconductor device design layout diagram 230 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the semiconductor device design layout diagram 230 to compensate for limitations during the mask fabrication 234, which may undo part of the modifications performed by OPC to meet mask creation rules.

In some embodiments, the mask data preparation 232 includes lithography process checking (LPC) that simulates processing that will be implemented by the semiconductor device fab 228. LPC simulates this processing based on the semiconductor device design layout diagram 230 to create a simulated manufactured device. The processing parameters in LPC simulation can include parameters associated with various processes of the semiconductor device manufacturing cycle, parameters associated with tools used for manufacturing the semiconductor device, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the semiconductor device design layout diagram 230.

The above description of mask data preparation 232 has been simplified for the purposes of clarity. In some embodiments, data preparation 232 includes additional features such as a logic operation (LOP) to modify the semiconductor device design layout diagram 230 according to manufacturing rules. Additionally, the processes applied to the semiconductor device design layout diagram 230 during data preparation 232 may be executed in a variety of different orders.

After the mask data preparation 232 and during the mask fabrication 234, a mask 236 or a group of masks 236 are fabricated based on the modified semiconductor device design layout diagram 230. In some embodiments, the mask fabrication 234 includes performing one or more lithographic exposures based on the semiconductor device design layout diagram 230. In some embodiments, an electron-beam (e-beam) or a mechanism of multiple e-beams is used to form a pattern on a mask (photomask or reticle) 236 based on the modified semiconductor device design layout diagram 230. The mask 236 can be formed in various technologies. In some embodiments, the mask 236 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 236 includes a transparent substrate (e.g., fused quartz) and an opaque material (e.g., chromium) coated in the opaque regions of the binary mask. In another example, the mask 236 is formed using a phase shift technology. In a phase shift mask (PSM) version of the mask 236, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 234 is used in a variety of processes. For example, such a mask(s) is used in an ion implantation process to form various doped regions in the semiconductor wafer 238, in an etching process to form various etching regions in the semiconductor wafer 238, and/or in other suitable processes.

The semiconductor device fab 228 includes wafer fabrication 240. The semiconductor device fab 228 is a semiconductor device fabrication business that includes one or more manufacturing facilities for the fabrication of a variety of different semiconductor device products. In some embodiments, the semiconductor device fab 228 is a semiconductor foundry. For example, there may be a manufacturing facility for the front end of line (FEOL) fabrication of a plurality of semiconductor device products, while a second manufacturing facility may provide the back end of line (BEOL) fabrication for the interconnection and packaging of the semiconductor device products, and a third manufacturing facility may provide other services for the foundry business.

The semiconductor device fab 228 uses the mask(s) 236 fabricated by the mask house 226 to fabricate the semiconductor structures or semiconductor devices 242 of the current disclosure. Thus, the semiconductor device fab 228 at least indirectly uses the semiconductor device design layout diagram 230 to fabricate the semiconductor structures or semiconductor devices 242 of the current disclosure. Also, the semiconductor wafer 238 includes a silicon substrate or other proper substrate having material layers formed thereon, and the semiconductor wafer 238 further includes one or more of various doped regions, dielectric features, multilevel interconnects, and the like (formed at subsequent manufacturing steps). In some embodiments, the semiconductor wafer 238 is fabricated by the semiconductor device fab 228 using the mask(s) 236 to form the semiconductor structures or semiconductor devices 242 of the current disclosure. In some embodiments, the semiconductor device fabrication includes performing one or more lithographic exposures based at least indirectly on the semiconductor device design layout diagram 230.

Disclosed embodiments include a semiconductor device that includes an OCC that provides shift pulses for shifting test patterns into and out of the device and capture pulses for exercising the device at-speed. The OCC controls the number of clock pulses and the clock speeds for the shift and capture phases. The number of clock pulses, such as the number of shift pulses and the number of capture pulses, can be any number of pulses and exceed the number of shift registers in the OCC. In some embodiments, test patterns are shifted into the device using shift pulses that are slow clock pulses and the device is exercised using capture pulses that are fast clock pulses and that exceed the number of shift registers in the OCC. In some embodiments, test patterns are shifted into the device using shift pulses that are slow clock pulses and the device is exercised using capture pulses that are fast clock pulses that are followed by shift pulses that are slow clock pulses and followed by more capture pulses that are fast clock pulses. In some embodiments, test patterns are shifted into the device using shift pulses that are slow clock pulses and the device is exercised using capture pulses that are fast clock pulses that are followed by shift pulses that are fast clock pulses and followed by more capture pulses that are fast clock pulses. In some embodiments, a test pattern that provides a maximum toggle rate is shifted into the device to provide a maximum toggle rate in the shortest time. In some embodiments, a test pattern with a chain (zero/one) pattern is shifted into the device to provide a maximum toggle rate after a longer period, such as for heat generation.

Disclosed embodiments further provide a method of obtaining power profile information on a semiconductor device. The method includes providing an OCC to control clock speeds for shifting test patterns and capturing results; running an automatic test pattern generation (ATPG) program to generate test patterns and report capture power; selecting a test pattern based on the capture power or a sequence pattern; updating signals to the OCC for shift and capture phases; running simulations to generate a vector change data (VCD) file; extracting the capture power from the VCD file; determining whether the capture power meets power requirements and if the capture power fails to meet the power requirements repeating the steps of selecting, updating, running, extracting, and determining whether the capture power meets power requirements; and preparing input for automatic test equipment (ATE) if the capture power meets the power requirements.

Advantages of the disclosed embodiments include providing any number of fast/slow clock pulses without increasing the number of shift registers in the OCC, managing the number of shift pulses and capture pulses, managing the sequence of the shift and capture phases, obtaining multiple power profiles with a single test, and targeting any testable path of a device for measurement and testing.

In accordance with some embodiments, a semiconductor device includes an OCC configured to provide a clock output signal and configured to receive a mode signal and a speed enable signal, and to generate a first fast clock enable signal and a first slow clock enable signal. The OCC is configured to override the first fast clock enable signal based on the mode signal and the speed enable signal to provide a fast clock in the clock output signal and to override the first slow clock enable signal based on the mode signal and the speed enable signal to provide a slow clock in the clock output signal.

In accordance with further embodiments, a circuit includes a first AND gate having a first non-inverted input configured to receive a mode signal and a second non-inverted input configured to receive a speed enable signal; a second AND gate having a third non-inverted input configured to receive the mode signal and an inverted input configured to receive the speed enable signal; a first OR gate configured to receive a first AND gate output signal from the first AND gate and a first fast clock enable signal and configured to output a second fast clock enable signal; and a second OR gate configured to receive a second AND gate output signal from the second AND gate and a first slow clock enable signal and configured to output a second slow clock enable signal.

In accordance with still further disclosed aspects, a method of obtaining power profile information on a semi-conductor device includes: providing an OCC to control clock speeds for shifting test patterns and capturing results; running an ATPG program to generate test patterns and report capture power; selecting a test pattern based on the capture power or a sequence pattern; updating signals to the OCC for shift and capture phases; running simulations using an EDA tool to generate a vector change data file for a capture period; extracting the capture power from the vector change data file for the capture period using the EDA tool or another EDA tool; determining whether the capture power meets power requirements and if the capture power fails to meet the power requirements repeating the steps of selecting, updating, running, extracting, and determining whether the capture power meets power requirements; and preparing input for ATE if the capture power meets the power requirements.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
an on-chip clock controller configured to provide a clock output signal and configured to receive a mode signal and a speed enable signal, and to generate a first fast clock enable signal and a first slow clock enable signal,
wherein the on-chip clock controller is configured to override the first fast clock enable signal based on the mode signal and the speed enable signal to provide a fast clock in the clock output signal and to override the first slow clock enable signal based on the mode signal and the speed enable signal to provide a slow clock in the clock output signal, and
wherein the on-chip clock controller includes a first clock circuit and a second clock circuit, wherein the first clock circuit includes a first AND gate having a first non-inverted input that receives the mode signal and a second non-inverted input that receives the speed enable signal, and a second AND gate having a third non-inverted input that receives the mode signal and an inverted input that receives the speed enable signal, wherein the first AND gate provides a first AND gate output signal and the second AND gate provides a second AND gate output signal.

2. The device of claim 1, wherein the on-chip clock controller includes the first clock circuit configured to provide a second fast clock enable signal based on the mode signal, the speed enable signal, and the first fast clock enable signal and to provide a second slow clock enable signal based on the mode signal, the speed enable signal, and the first slow clock enable signal.

3. The device of claim 2, wherein the on-chip clock controller includes the second clock circuit that receives the second fast clock enable signal and the second slow clock enable signal and provides the clock output signal.

4. The device of claim 1, wherein the first clock circuit includes a first OR gate that receives the first AND gate output signal and the first fast clock enable signal and provides a second fast clock enable signal, and a second OR gate that receives the second AND gate output signal and the first slow clock enable signal and provides a second slow clock enable signal.

5. The device of claim 4, wherein the second clock circuit receives the second fast clock enable signal, the second slow clock enable signal, a fast clock signal, and a slow clock signal and provides the clock output signal.

6. The device of claim 5, wherein the second clock circuit includes a third AND gate and a fourth AND gate, wherein the third AND gate receives the second fast clock enable signal and the fast clock signal and provides a gated fast clock signal and the fourth AND gate receives the second slow clock enable signal and the slow clock signal and provides a gated slow clock signal.

7. The device of claim 6, wherein the second clock circuit includes a third OR gate that receives the gated fast clock signal and the gated slow clock signal and provides the clock output signal.

8. The device of claim 1, wherein the on-chip clock controller controls the clock output signal to oscillate at a fast clock speed with the mode signal high and the speed enable signal high.

9. The device of claim 1, wherein the on-chip clock controller controls the clock output signal to oscillate at a slow clock speed with the mode signal high and the speed enable signal low.

10. The device of claim 1, wherein the on-chip clock controller controls the clock output signal to oscillate at a fast clock speed with the first fast clock enable signal high and at a slow clock speed with the first slow clock enable signal high.

11. A circuit, comprising:
a first AND gate having a first non-inverted input configured to receive a mode signal and a second non-inverted input configured to receive a speed enable signal;
a second AND gate having a third non-inverted input configured to receive the mode signal and an inverted input configured to receive the speed enable signal;
a first OR gate configured to receive a first AND gate output signal from the first AND gate and a first fast clock enable signal and configured to output a second fast clock enable signal;
a second OR gate configured to receive a second AND gate output signal from the second AND gate and a first slow clock enable signal and configured to output a second slow clock enable signal;
a third AND gate configured to receive the second fast clock enable signal and a fast clock signal and configured to output a gated fast clock signal;
a fourth AND gate configured to receive the second slow clock enable signal and a slow clock signal and configured to provide a gated slow clock signal; and a third OR gate configured to receive the gated fast clock signal and the gated slow clock signal and configured to output a clock output signal.

12. The circuit of claim 11, wherein the circuit controls the clock output signal to oscillate at a fast clock speed with the mode signal high and the speed enable signal high.

13. The circuit of claim 11, wherein the circuit controls the clock output signal to oscillate at a slow clock speed with the mode signal high and the speed enable signal low.

14. The circuit of claim 11, wherein the circuit controls the clock output signal to oscillate at a fast clock speed with the first fast clock enable signal high and at a slow clock speed with the first slow clock enable signal high.

15. The circuit of claim 11, wherein the circuit generates the first fast clock enable signal and the first slow clock enable signal.

16. The circuit of claim 11, wherein the circuit receives the fast clock signal and the slow clock signal from outside the circuit.

17. A device, comprising:
an on-chip clock controller configured to receive a mode signal, a speed enable signal, a first fast clock enable signal, and a first slow clock enable signal, the on-chip clock controller configured to override the first fast clock enable signal based on the mode signal and the speed enable signal to provide a fast clock in a clock output signal and to override the first slow clock enable signal based on the mode signal and the speed enable signal to provide a slow clock in the clock output signal,
wherein the on-chip clock controller includes a first clock circuit that includes a first AND gate having a first non-inverted input that receives the mode signal and a second non-inverted input that receives the speed enable signal and provides a first AND gate output signal, and a second AND gate having a third non-inverted input that receives the mode signal and an inverted input that receives the speed enable signal and provides a second AND gate output signal.

18. The device of claim 17, wherein the on-chip clock controller includes the first clock circuit configured to provide a second fast clock enable signal based on the mode signal, the speed enable signal, and the first fast clock enable signal and to provide a second slow clock enable signal based on the mode signal, the speed enable signal, and the first slow clock enable signal.

19. The device of claim 18, wherein the on-chip clock controller includes a second clock circuit that receives the second fast clock enable signal and the second slow clock enable signal and provides the clock output signal.

20. The device of claim 17, wherein the first clock circuit includes a first OR gate that receives the first AND gate output signal and the first fast clock enable signal and provides a second fast clock enable signal, and a second OR gate that receives the second AND gate output signal and the first slow clock enable signal and provides a second slow clock enable signal.

* * * * *